United States Patent [19]

Bents

[11] Patent Number: 4,966,200

[45] Date of Patent: Oct. 30, 1990

[54] TIE BOLT ACCUMULATOR WITH SAFETY VALVE

[75] Inventor: Terry Bents, Pocohontas, Iowa

[73] Assignee: Iowa Industrial Hydraulics, Inc., Pocahontas, Iowa

[21] Appl. No.: 301,115

[22] Filed: Jan. 25, 1989

[51] Int. Cl.⁵ .......................................... F16L 55/04
[52] U.S. Cl. ............................... 138/31; 220/DIG. 20
[58] Field of Search ........................... 138/26, 30, 31; 220/DIG. 20, 85 B

[56] References Cited

U.S. PATENT DOCUMENTS

| 214,716 | 4/1879 | Shaw | 138/31 |
|---|---|---|---|
| 1,361,946 | 12/1920 | Whitaker | 220/DIG. 20 |
| 2,725,897 | 12/1955 | Crooks | 138/31 |
| 2,804,094 | 8/1957 | Gratzmuller | 138/31 |
| 2,809,667 | 10/1957 | Knapp et al. | 138/31 |
| 2,979,903 | 4/1961 | Beck . | |
| 3,084,717 | 4/1963 | Purcell | 138/31 |
| 3,202,060 | 8/1965 | Grotness . | |
| 3,286,797 | 11/1966 | Leibfritz et al. . | |
| 4,122,969 | 10/1978 | Hugley | 220/DIG. 20 |
| 4,135,640 | 1/1979 | MacQuilkin et al. | 220/DIG. 20 |
| 4,139,118 | 2/1979 | Parker | 220/DIG. 20 |
| 4,233,000 | 11/1980 | Cox . | |
| 4,541,779 | 9/1985 | Birdwell . | |

FOREIGN PATENT DOCUMENTS 302787  8/1928  United Kingdom ....... 220/DIG. 20

Primary Examiner—James E. Bryant, III
Attorney, Agent, or Firm—Barnes & Thornburg

[57] ABSTRACT

A tie bolt accumulator wherein a smooth cylinder is attached to end caps by means of tie bolts and a safety venting valve mechanism which insures that the tie bolt accumulator cannot be disassembled until the pressure in the tie bolt accumulator has been vented.

16 Claims, 2 Drawing Sheets

TIE BOLT ACCUMULATOR WITH SAFETY VALVE

BACKGROUND AND SUMMARY OF THE INVENTION

The invention relates to an improved tie bolt accumulator and a safety venting valve mechanism which insures that the tie bolt accumulator cannot be disassembled until the pressure in the tie bolt accumulator has been vented.

Accumulators have been used for storage of high pressure fluids in hydraulic circuitry. In the past, problems have arisen in the use of these accumulators in that the nitrogen used to pressurized the accumulators is normally obtained from commercial sources and contains moisture. The moisture inside the accumulator can cause rust and other corrosion which will shorten the life of an accumulator. Of great importance in accumulators is their ability to provide for a high pressure source of hydraulic fluid and this necessitates that the piston therein be able to be moved freely.

In the past, accumulators have been made using cylinders which have been welded to end caps to provide a housing for the piston inside the accumulator. The welding of the cylinder to the end caps leaves an area underneath the weld which can contaminate the interior of the cylinder and cause breakdown of the accumulator.

Another known method of making accumulators has the end cap and the cylinder wall screwed to one another. Threading the internal area of the cylinder has caused sharp threads or grooves at the ends of the cylinder which can attack and tear the seals of the piston. This is especially true upon insertion of the piston into the cylinder. Additionally, these types of threaded end caps require large spanner wrenches for removal and the threads can easily be jammed inhibiting cleaning and reusing of the accumulator.

Under both the welded and the screw-in type of accumulator, the ability to clean the accumulator is severely limited. This is true even when one end cap is welded and the other end cap is screwed on. The reason for this difficulty is that where a weld joint between the cylinder and the end cap occur, this also allows for a small space into which debris from the weld can accumulate and eventually contaminate the accumulator. Also, the screw threads attack the cleaning process material and shred it and there is a chance that some of the brushes or other material used to clean the accumulator will be retained inside the cylinder.

Another disadvantage of the welded on type of end cap is that replacement requires replacement of the whole unit and does not allow for replacing only the end cap or the cylinder itself.

Applicant has provided a new type of accumulator which is designed so as to avoid the previously mentioned disadvantages occasioned by screw threads and welding. In applicants' accumulator, a cylinder is slidingly connected to two end caps and tie bolts are extended between the two end caps to hold the cylinder in sealing and abutting relationship to the end caps. In this manner, the tie bolt accumulator is easily disassembled for cleaning purposes and there are no rough edges due to screw threads in the assemblage.

The tie bolts extend on the outside of the tie bolt accumulator and they are held on by nuts at one end. The other end of the tie bolt can be screwed into an end cap of the tie bolt accumulator while the other end is provided with a nut to secure the other end cap. If the tie bolts should rust or corrode into the end caps or if the bolts have their nuts frozen to the bolts themselves, this assembly is still easily opened for cleaning. This opening is obtained by merely sawing the tie bolt and removing it. Thus, the end cap and body are unaffected and may be reused with new tie bolts. Replacement of a tie bolt is a very inexpensive item in servicing an accumulator.

This tie bolt construction has an extreme advantage over the assemblage wherein the cylinder is either welded to, or screwed directly to, the end cap. In those type of devices, the end cap and cylinder of the welded construction have to be replaced as a unit. If the screw threads of the end cap corrode with the cylinder, again one has to replace the whole unit.

In the present invention the tie bolt accumulator end caps have a cylindrical inner surface which is slightly smaller than the cylinder internal diameter. Thus, a seal can be placed on the smaller diameter and the end caps are slid into the cylinder Then the tie bolts are extended through one end cap and threaded into the other end cap. The nuts are screwed onto the ends of the tie bolts to produce a tight assembly.

For cleaning purposes, all one has to do is unscrew the bolts (or their nuts), slide them out, pull of the end caps and all the surfaces that are internal to the tie bolt accumulator are now available for cleaning. None of these surfaces have rough edges and they are therefore easily cleaned.

A further feature resides in the tie bolt accumulator of the invention in that there is a safety mechanism to keep the tie bolt accumulator from being disassembled for cleaning purposes when there is still pressure in the tie bolt accumulator.

It would be extremely dangerous to start to undo the tie bolts when there is high pressure nitrogen inside the accumulator. Accordingly, the invention provides for a venting valve which automatically vents the high pressure nitrogen prior to disassembly of the tie bolts themselves. In this regard, the venting valve is screwed into an end caP of the tie bolt accumulator. When it is desired to disassemble the tie bolt accumulator for cleaning purposes, the vent valve is unscrewed and the nitrogen inside the accumulator is vented around the vent valve.

The venting valve can be attached to a cover which encases the outer edge of the end cap of a tie bolt accumulator. The nuts on the tie bolts are located under this cover. The venting valve is attached to the cover in such a manner that the cover cannot be removed until the venting valve is unscrewed enough to provide for venting of the tie bolt accumulator itself.

After the venting valve has been unscrewed, the cover is either moved outwardly a sufficient distance, such that the nuts on the end of the tie bolts become accessible or the cover is completely removed so the nuts can be unscrewed to disassemble the tie bolt accumulator. Prior to the time the vent is unscrewed, the nuts on the ends of the tie bolts are not accessible. The vent valve can be attached to the cover to cause the cover to move as the vent valve is opened to provide access to the underlying nuts or the vent valve can be separated from the end cap along with the cover.

In order to insure that the vent valve is retained with the cover to cause movement thereof, or to keep the valve in place for reassembly a clip is located on the vent valve between the cover and the end plate, such that the vent valve is retained to the inside of the cover as well as by having the screw head of the vent valve on the outside of the cover. The screw head of the vent valve is larger than the hole in the cover. In assembling the vent valve, it is slid through a hole in the cover and the clip is placed on the inside. Then the cover is placed over top of the end cap and the screw of the vent valve is tightened down to close off the venting passageway. Thus, it can be seen that the vent valve is joined to the cover in such a manner that the cover cannot be removed until the tie bolt accumulator has been vented.

The method for disassembling the tie bolt accumulator is to first unscrew the vent valve a sufficient amount to allow for venting of the nitrogen inside of the accumulator around the vent valve. This unscrewing of the vent valve either raises the cover away from the ends of the tie bolts or allows for its removal. When the cover is removed from the ends of the tie bolts, a wrench can be applied to the nut on the ends of the tie bolts to unscrew them and the tie bolts can then be removed and the end caps slid off from the cylinder. At this point, the whole assemblage can be cleaned or any portion or part thereof can be replaced.

Other objects, advantages and novel features of the present invention will become apparent from the following detailed description of the invention when considered in conjunction with the accompanying drawings.

DETAILED DESCRIPTION OF THE DRAWINGS

Figure 1:
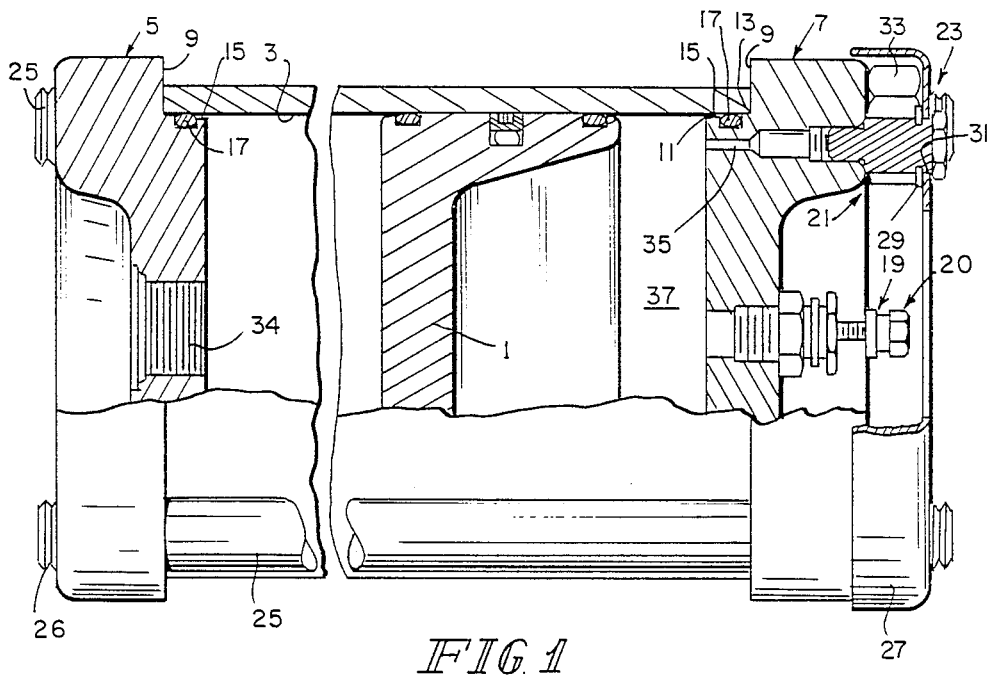
FIG. 1 is a partial cross-sectional view showing the tie bolt accumulator and safety valve in cross-section in the upper portion while the lower portion is in full view.

FIG. 1 shows a tie bolt accumulator wherein a piston 1 is sealingly positioned into a cylinder 3. At each end of the cylinder are end caps 5 and 7, respectively. Each of the end caps has a surface 9 which abuts the end of the cylinder 3. The end caps 5 and 7 have a portion 15, protruding inwardly from the corner 13 adjacent the end of the end cap which abuts the end of the cylinder 3 at point 11 at the inner end of the end cap.

A seal 17, or O-ring is located in a recess on this surface to provide a fluid tight connection with the interior surface of the cylinder 3.

Figure 2:
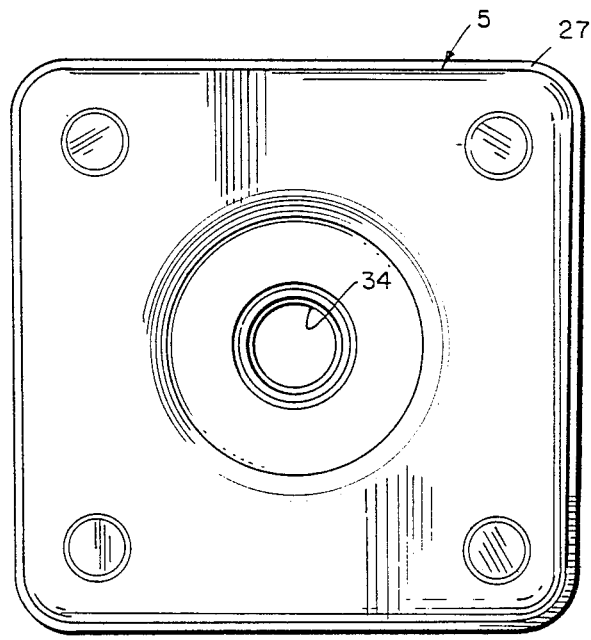
FIG. 2 is an end view of a tie bolt accumulator showing the square section configuration.
Figure 3A:
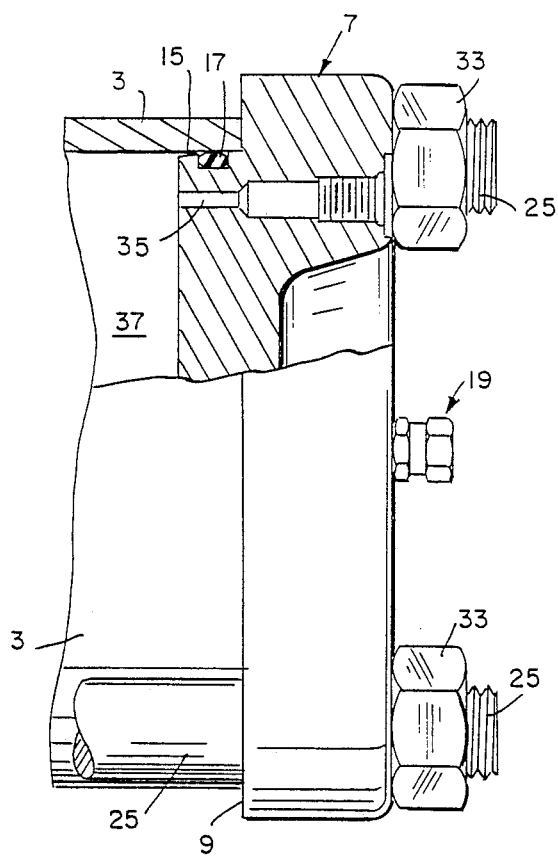
FIGS. 3A and 3B show the end cap with the cover removed as seen in the FIG. 1 figure.
Figure 3B:
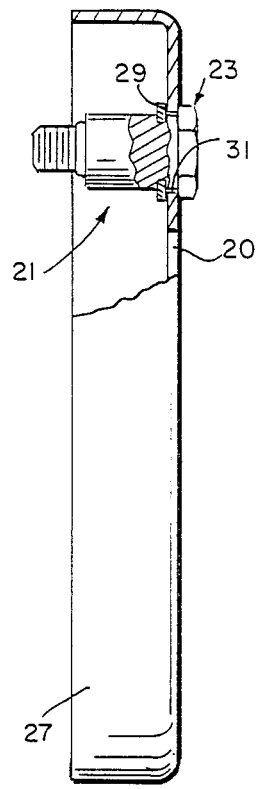

The end caps are held with their surface 9 against cylinder 3 by a plurality of tie bolts 25. These tie bolts 25 extend longitudinally of the accumulator at the corner of the end caps 5, 7 (see FIG. 2). One end 26 thereof can be screwed into end cap 5 while the other end is secured by a nut 33.

The end cap 7 also has a fill valve 19 which typically is threaded into a bore in end cap 7. Also located in the end cap 7 is a vent which is screwed into another bore in the end cap 7 by means of nut 23 located on its exterior end. The vent valve passes through a hole 31 located in the cover 27 and is retained in there by means of a clip 29 located on the inside of the cover 27. The cover 27 encases and encloses nuts 33 which are located at the end of each tie bolt 25 as well as provides a central opening 20 for access to the fill valve 19. The nut 33 is screwed onto the tie bolt 25 which forces the two end caps 5 and 7 together and tightly about the ends of the cylinder 3. The other end cap has a threaded bore 34 for connection to the hydraulic circuit into which the accumulator is used.

When it is desired to disconnect the tie bolt accumulator so that the accumulator can be cleaned, the vent valve 21 is unscrewed by turning the nut 23. Unscrewing of the vent valve 21 by the nut 23 causes the vent valve 21 to back out of the end cap 7 carrying with it the cover 27. As the vent valve 21 is backed out, high pressure nitrogen in the chamber 37 can be vented through the passageway 35, around the vent valve 21 so as to relieve the pressure therein. As the vent valve 21 is backed out carrying with it the cover 27, the nuts 33 come into view and can be unscrewed from the tie bolt 25 by a wrench. Alternatively it can be required that the vent valve be completely unscrewed so the cover can be lifted away from the tie bolt accumulator. After unscrewing of the nuts 33, the tie bolts 25 can be removed and the end caps 5 and 7 released from the cylinder 3. At that point, the interior of the tie bolt accumulator is completely accessible and the piston can be removed. Since all surfaces are smooth, cleaning is easily accomplished.

If a nut 33 is frozen onto the tie bolt 25, the tie bolt 25 can be cut. Cutting of the tie bolt 25 will allow the end cap to be removed. Cutting of the tie bolt 25 is a relatively easy job and the cost of the tie bolt itself is quite insignificant as compared to the total unit cost of the tie bolt accumulator. Hence, by having the tie bolts located around the exterior side of tie bolt accumulator, one can obtain an accumulator which is easily repaired and cleaned and offers an advantage over the previous types of accumulators wherein the cylindrical cylinder 3 is either welded to or bolted to the end caps.

The tie accumulator can be mounted to a supporting frame by brackets (not shown) which are attached to the tie bolts 25 or to the end caps 5 or 7. Alternatively a U-bolt or U-clamp can be passed around the cylinder wherein the legs of the U-bolt or U-clamp can be secured to a supporting frame. The square ends of the end plates could cooperate with a bracket attached to a supporting frame, with or without clamps and could have interlocking pins or screws and cooperating holes for securing the tie bolt accumulator to the bracket. The brackets could be mounted to the end caps at their rectangular ends or along their edges.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A tie bolt accumulator comprising:
   a cylindrical section having a smooth uninterrupted circumferential internal surface;
   two end caps having cylindrical surfaces underlying said smooth uninterrupted circumferential internal surface and with an external circumferential surface only slightly less large than the smooth circumferential surface of the cylindrical section and external surface areas extending radially outwardly of the cylindrical surface;

a piston located internally of the cylindrical section and sealing engaged therewith;

seal means on the cylindrical surfaces of the two end caps for sealing the cylindrical surfaces with the cylindrical smooth internal surfaces of the cylindrical section;

a plurality of tie bolt means extending between said end caps and externally of said cylindrical section for holding the external surfaces of said end caps against ends of the cylindrical section;

inlet fill means located on one end cap, for the admission of high pressure fluid to the tie bolt accumulator; and;

including preventive means for preventing disassembly of the end caps by the tie bolt means until the high pressure fluid admitted to the tie bolt accumulator has been released.

2. A tie bolt accumulator according to claim 1, wherein the preventive means includes a valve screwable into the one end cap.

3. A tie bolt accumulator according to claim 2, wherein the preventive means includes a cover means for preventing access to end of the tie bolt means.

4. A tie bolt accumulator according to claim 2, wherein the valve is secured to the cover means such that the cover means cannot be removed until the valve is at least partially unscrewed from the one end cap to allow high pressure fluid in the accumulator to be released.

5. A tie bolt accumulator according to claim 4, wherein a snap ring secures the valve to the cover means.

6. A tie bolt accumulator according to claim 1, wherein the tie bolt means has a clamping nut; and wherein the preventive means for preventing disassembly of the end caps by the tie bolt means includes a releasable cover means for preventing access to the clamping nut of the tie bolt means.

7. A tie bolt accumulator according to claim 6, wherein a venting valve is attached to both the one end cap and the cover means.

8. A tie bolt accumulator according to claim 7, wherein the venting valve prevents release of the cover means prior to the venting of the cylinder by the venting valve.

9. A tie bolt accumulator comprising:

a cylindrical section having a smooth uninterrupted circumferential internal surface;

two end caps each having generally cylindrical surfaces underlying and only slightly smaller than the smooth uninterrupted circumferential internal surface of the cylindrical section and external surface areas extending radially outwardly of the generally cylindrical surface;

a piston located internally of the cylindrical section and sealing engaged therewith;

a plurality of tie bolts means extending between said end cap means and externally of said cylindrical section for holding the external surface areas of said end caps against ends of the cylindrical section;

inlet fill means for the admission of high pressure fluid to the tie bolt accumulator; and preventive means for preventing disassembly of the end caps by the tie bolt means until pressure fluid admitted to the tie bolt accumulator has been released.

10. A tie bolt accumulator according to claim 9, wherein the preventive means includes a valve screwable into one of the end caps.

11. A tie bolt accumulator according to claim 10, wherein the preventive means includes a cover means for preventing access to ends of tie bolt means.

12. A tie bolt accumulator according to claim 11, wherein the valve is secured to the cover means such that the cover means cannot be removed until the valve is at least partially unscrewed from one end cap to allow high pressure fluid in the accumulator to be released.

13. A tie bolt accumulator according to claim 12, wherein a snap ring secures the valve to the cover means.

14. A tie bolt accumulator according to claim 9, wherein the tie bolt means has a clamping nut; and wherein the preventive means for preventing disassembly of the end caps by the tie bolt means includes a releasable cover means for preventing access to the clamping nut of the tie bolt means.

15. A tie bolt accumulator according to claim 14, wherein a venting valve is attached to both the end cap and the cover means.

16. A tie bolt accumulator according to claim 15, wherein the venting valve prevents release of the cover means prior to the venting of the cylinder by the venting valve.

* * * * *